United States Patent
Sester et al.

(10) Patent No.: US 9,476,463 B2
(45) Date of Patent: Oct. 25, 2016

(54) PISTON-CYLINDER ARRANGEMENT, IN PARTICULAR FOR A CLUTCH ACTUATION SYSTEM IN A MOTOR VEHICLE

(71) Applicant: Schaeffler Technologies GmbH & Co. KG, Herzogenaurach (DE)

(72) Inventors: Christof Sester, Gengenbach (DE); Thomas Gwosch, Karlsruhe (DE); Luben Krahtov, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 14/414,786

(22) PCT Filed: Jul. 16, 2013

(86) PCT No.: PCT/DE2013/200051
§ 371 (c)(1),
(2) Date: Jan. 14, 2015

(87) PCT Pub. No.: WO2014/012540
PCT Pub. Date: Jan. 23, 2014

(65) Prior Publication Data
US 2015/0204389 A1 Jul. 23, 2015

(30) Foreign Application Priority Data
Jul. 17, 2012 (DE) .................. 10 2012 212 446

(51) Int. Cl.
*F16D 25/08* (2006.01)
*F16D 25/12* (2006.01)

(52) U.S. Cl.
CPC ............. *F16D 25/083* (2013.01); *F16D 25/12* (2013.01); *F16D 2300/08* (2013.01)

(58) Field of Classification Search
CPC ............ F15B 15/1461; F15B 15/1457; F16D 25/08; F16D 25/083; F16D 25/087; F16D 25/12; F16D 2300/08; F16J 15/3268
See application file for complete search history.

(56) References Cited

U.S. PATENT DOCUMENTS

| | | | |
|---|---|---|---|
| 5,113,991 A * | 5/1992 | Kajitani | F16D 25/087 192/85.51 |
| 6,273,231 B1 | 8/2001 | Koschmieder et al. | |
| 6,328,148 B2 * | 12/2001 | Winkelmann | 192/85.51 |

FOREIGN PATENT DOCUMENTS

| | | |
|---|---|---|
| DE | 19949205 | 4/2000 |
| DE | 102011103376 | 12/2011 |

OTHER PUBLICATIONS

English language machine translation of DE 102011103376 A1 downloaded from epo.org on Mar. 28, 2016.*

* cited by examiner

*Primary Examiner* — Richard Lorence
(74) *Attorney, Agent, or Firm* — Volpe and Koenig, P.C.

(57) ABSTRACT

A piston-cylinder arrangement, in particular for a clutch actuation system in a motor vehicle, including a housing (10) that is concentrically arranged around a shaft (11), and an annular pressure chamber (1) inside which a piston (13) is movably mounted. A sealing ring support (14) on which a seal (15) is arranged is connected to the piston. In a piston-cylinder arrangement which is less expensive to produce and nevertheless reliably prevents gap extrusion of the seal between the housing and the sealing ring support, the piston is connected without play to the sealing ring support.

9 Claims, 2 Drawing Sheets

PISTON-CYLINDER ARRANGEMENT, IN PARTICULAR FOR A CLUTCH ACTUATION SYSTEM IN A MOTOR VEHICLE

BACKGROUND

The invention relates to a piston-cylinder arrangement, particularly for a clutch actuation system in a motor vehicle, comprising a housing, which is arranged concentrically around a shaft, and an annular pressure chamber, inside which a piston is movably mounted, with a sealing ring support, on which a seal is arranged, that is connected to the piston.

Clutch actuation systems are used in motor vehicle, in order to engage and/or disengage the traction between a motor and a transmission. In hydraulic clutch slave cylinders, a seal is fastened on the piston with the help of a sealing ring support having a defined axial play or is arranged directly on the piston without any play. FIG. 1 shows a seal connection with a defined axial play. The clutch slave cylinder 1 comprises a housing 2, which is arranged rotationally symmetrical around a shaft 3. Here, the housing 2 forms an annular pressure chamber 4, in which a piston 5 is arranged in a movable fashion. The piston 5 carries a sealing ring support 6, on which a seal 7 is fastened. The sealing ring support 6 is either formed from steel or plastic. The plastic variant is commonly used to avoid any gap extrusion of the seal 7 between the housing 2 and the sealing ring support 6. The sealing ring support 6 is connected to the piston 5 with a defined axial play. This way the wear and tear of the seal, generated by the vibration, preferably of the clutch, is reduced in the unpressurized operating state.

In a variant without play, as shown in FIG. 2, the seal 7 directly abuts the piston 5. In order to avoid any gap extrusion, here two separate plastic rings 8 are used as sealing ring carriers. The connection of the seal 7 at the piston 3, free from any play, clearly defines the position of the seal and thus the operating state. However, in this arrangement increased wear and tear of the seal 7 occurs, because the vibrations directly attack the seal 7. Furthermore, a multi-layered arrangement is necessary in the form of the seal 7 and the sealing support in the form of the two plastic rings 8 in order to ensure a connection of the seal 7 at the piston 5 without any play, which increases the production costs for such a clutch slave cylinder 1. When the plastic rings 8 are embodied with connecting bridges the piston 5 is weakened and uneven transitions develop. Here, an oriented installation is required due to the bridges.

SUMMARY

The invention is therefore based on the objective to provide a piston-cylinder arrangement, in which in spite of a cost-saving production, any gap extrusions of the seal between the sealing ring support and the housing is reliably prevented.

According to the invention the objective is attained in that the piston is connected to the sealing ring support without any play. By the use of a plastic sealing ring support, embodied in one piece, the gap extrusions of the seal between the housing and the sealing ring support are reliably prevented. The use of such a plastic sealing ring support reduces the production costs and minimizes the assembly expenses.

Advantageously the piston is connected via a threaded connection to the sealing ring support. The threaded connection ensures here a connection between the piston and the sealing ring support without any play. The gap extrusion occurring by the radial play of the seal between the housing and the sealing ring support is prevented by the seal being impressed into the gap depending on the temperature and the pressure.

In one embodiment the threaded connection is mounted outside or inside the piston. This way, according to the structural space available in the respective clutch actuation device it can be decided how the threaded connection is embodied, which furthermore leads to cost reductions during the production of the piston-cylinder arrangement.

In one variant a direction of rotation of the threaded connection is adjusted to the direction of rotation of the piston, so that the sealing ring support is tightened during operation of the piston. This way it is ensured that the threaded connection cannot loosen during the operation of the piston and thus the clutch cannot disengage, because by the predetermined direction of rotation of the threaded connection it always moves it in the closing direction.

In one embodiment the pitch of the thread of the threaded connection is embodied in a self-locking fashion. Due to the fact that during the production of the piston-cylinder arrangement the torque and the angle of rotation can be controlled when applying the threaded connection, a self-locking effect leads to the thread not being loosened and thus it is always moved in the locking direction.

In a further development, the pitch of the thread is embodied flat. The flat embodiment of the pitch ensures the self-locking effect of the thread. Furthermore, a simple assembly of the piston-cylinder arrangement is ensured in a flat pitch.

Advantageously the threaded connection also includes latch hooks. These latch hooks form an additional safety in order to avoid any loosening of the threaded connection. By selecting the latch hooks a secured angle of rotation can be defined. Furthermore, the axial motion between the latch hooks is reduced and thus it can be well adjusted.

In one embodiment the sealing ring support, embodied in one piece, is preferably embodied approximately rotationally symmetrical. By the embodiment of the sealing ring support in one piece and closed in its circumference the gap extrusion is further reduced. Based on the embodiment from a soft plastic a radial motion is performed by the sealing ring carrier, with here the gap between the housing and the piston being reliably closed.

In one variant the seal is fastened exclusively at the sealing ring support and preferably supported in an arch of the sealing ring support. By the support of the seal in the sealing ring support a simple preliminary assembly of the seal in the sealing ring support is given prior to the installation in the piston-cylinder arrangement. Furthermore, a simpler and tougher handling of the sealing ring support is possible.

In a further development the sealing ring support has an approximately U-shaped profile, with a base of the U-profile contacting the piston, while the two legs of the U-profile contact the housing and the seal is supported between the two legs of the U-profile of the sealing ring support. Based on this embodiment the sealing ring support implements via the thread not only the axial connection to the piston, free from play, but simultaneously the reduction of the gap extrusion with the help of the legs of the U-profile. Using this embodiment only a single component is necessary to realize both objectives, reducing the production expenses of the piston-cylinder arrangement.

BRIEF DESCRIPTION OF THE DRAWINGS

The invention allows numerous embodiments. One of them shall be explained in greater detail based on the figures shown in the drawing.

Shown are.

Identical features are marked with the same reference characters.

DETAILED DESCRIPTION OF THE PREFERRED EMBODIMENTS

Figure 1:
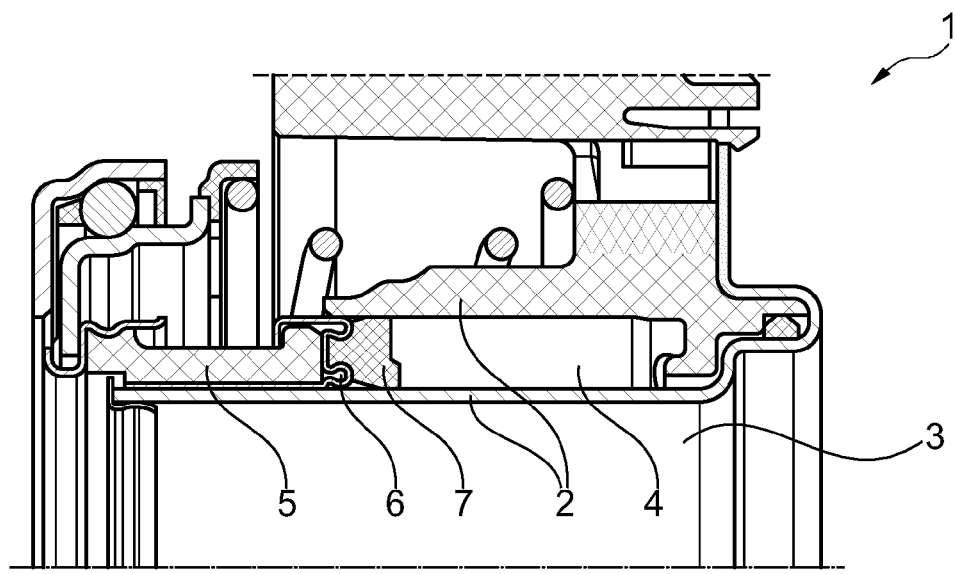
FIG. 1: a piston-cylinder arrangement with a defined axial play according to prior art.
Figure 2:
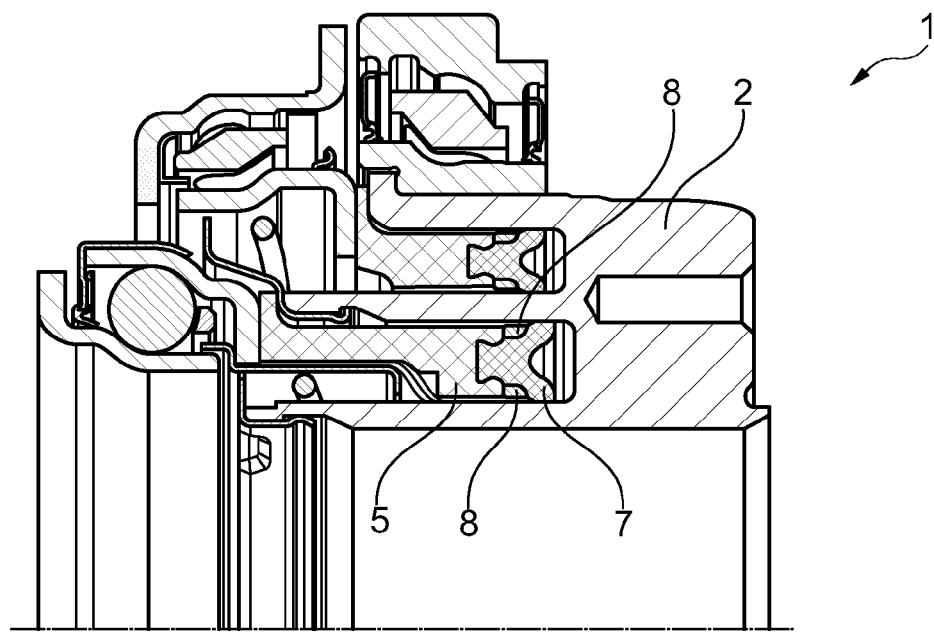
FIG. 2: another piston-cylinder arrangement with a sealing connection according to prior art, free from play.
Figure 3:
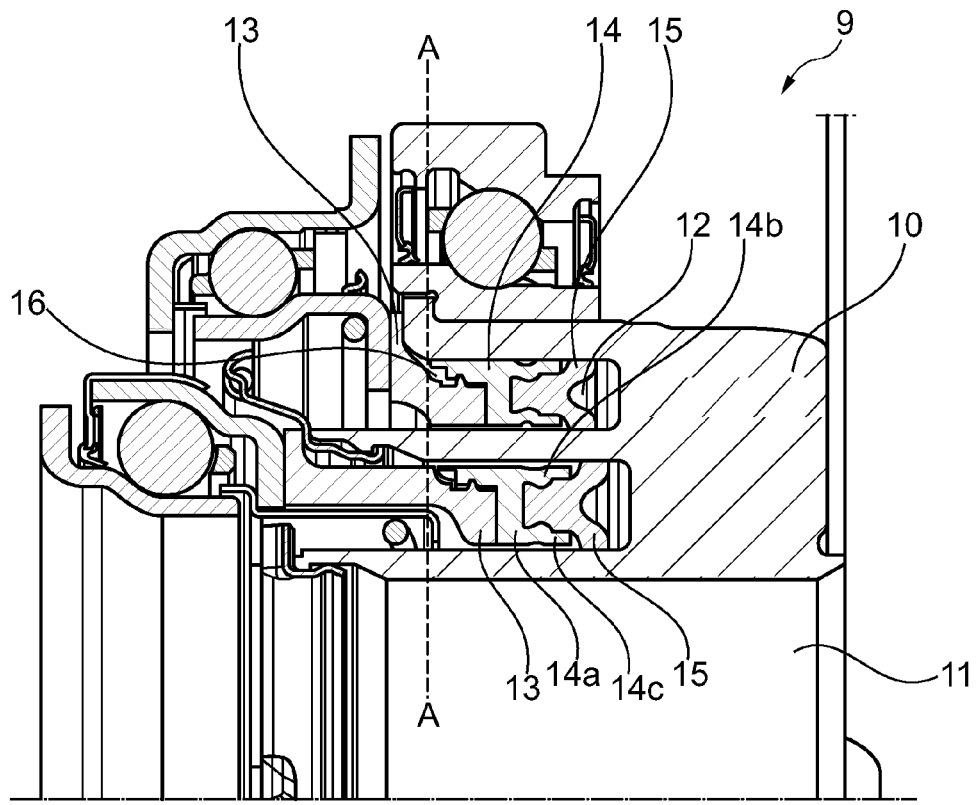
FIG. 3: an exemplary embodiment of a piston-cylinder arrangement according to the invention.

FIG. 3 shows a piston-cylinder arrangement 9, commonly used as clutch slave cylinders in a clutch actuation device of a motor vehicle. FIG. 3 shows here a detail from a duplex clutch slave cylinder, which is used in duplex clutch arrangements. The use of the invention in a clutch slave cylinder to operate a single clutch is also possible.

The piston-cylinder arrangement 9 comprises a housing 10, which extends rotationally symmetric around a shaft 11. An annularly embodied pressure chamber 12 extends in the housing 10, in which a piston 13 is supported in a movable fashion. The piston 13 comprises here a sealing ring support 14 in the direction towards the pressure chamber 12, in which a seal 15 is arranged.

The sealing ring support 14 shows an approximately U-shaped profile, with the base 14a of the sealing ring support 14 directly abutting the piston 13, while the legs 14b, 14c of the sealing ring support 14 extending axially along the housing 10, contacting it. Advantageously the housing 10 comprises a guiding sheath, not shown in greater detail, near the leg 14c and supported in the direction towards the shaft 11, with one leg 14c directly contacting the guiding sheath. A seal 15 is inserted between the legs 14b, 14c of the sealing ring support 14, which has no connection to the piston 13. The seal 15 projects beyond the sealing ring support 14 in the axial direction, opposite the piston 13, and contacts the housing 10 above the legs 14b, 14c of the sealing ring support 14, causing the gap extrusion of the seal 15 between the sealing ring support 14 and the housing 10 to be reduced or entirely prevented.

The sealing ring support 14 is fastened via a threaded connection to the piston 13, with in the present case the sealing ring support 14 being twisted onto the piston 13. The piston 13 has here a thread 16 at its exterior circumference.

Figure 4:
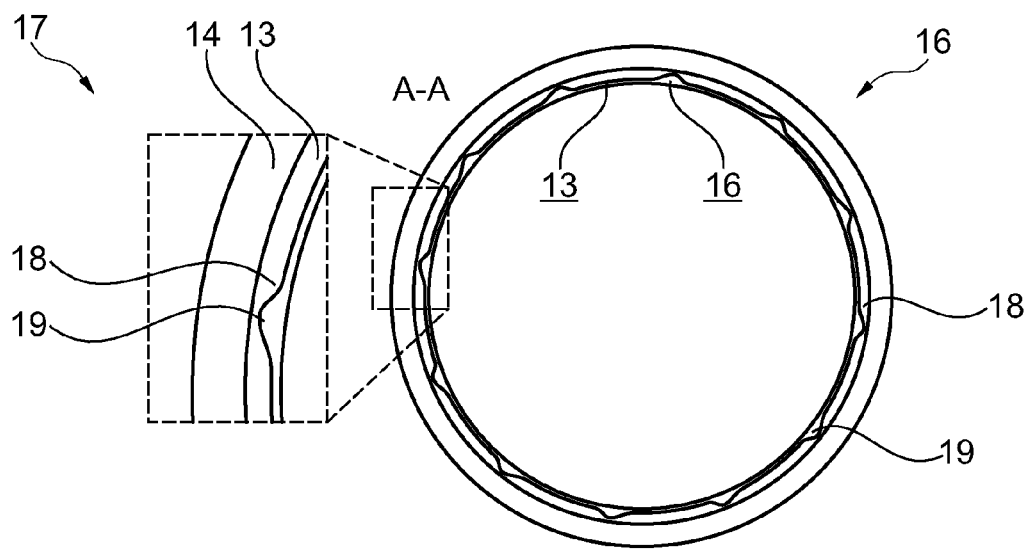
FIG. 4: a cross-section through a piston-cylinder arrangement according to FIG. 3.

A cross-section A-A of the piston-cylinder arrangement 9 is shown in FIG. 4. Here, the sealing support 14 comprises the piston 13. Latching hooks 18, 19 are embodied at the thread 17 both at the interior surface of the sealing ring support 14 as well as the exterior surface of the piston 13. These latching hooks 18, 19 are used to avoid any loosening of the thread 17. The secure angle of rotation can be defined by the selection of the latching hooks 18, 19. The latching hooks 18, 19 thereby allow that the thread 17 is embodied in a self-locking fashion. The self-locking effect of the thread 17 is here further supported in that the pitch is selected flat, ensuring a simple assembly of the thread 17.

The direction of rotation of the thread 17 is coordinated with the direction of rotation of the clutch, not shown in greater detail, so that it is ensured that the sealing ring support 14 during operation of the clutch always twists onto the piston 13 so that the threaded connection is always in the closed state and any loosening of the thread 17 is reliably prevented.

Due to the suggested piston-cylinder arrangement, in reference to the sealing arrangement with a defined axial play, here a displacement of the parameter of the clutch is reliable prevented at a rapid clutch operation. Furthermore, the assembly is facilitated by the connection of the sealing ring support 14 to the piston 13, without any play, via the thread 17.

LIST OF REFERENCE CHARACTERS

1 Clutch slave cylinder
2 Housing
3 Shaft
4 Pressure chamber
5 Piston
6 Sealing ring support
7 Seal
8 Plastic ring
9 Piston-cylinder arrangement
10 Housing
11 Shaft
12 Pressure chamber
13 Piston
14 Sealing ring support
14a Base of the sealing ring support
14b Leg of the sealing ring support
14c Leg of the sealing ring support
15 Seal
16 Thread
17 Pitch
18 Latching hook
19 Latching hook

The invention claimed is:

1. A piston-cylinder arrangement, comprising a housing concentrically arranged around a shaft, and an annular pressure chamber in which a piston is supported in a movable fashion, a sealing ring support, on which a seal is arranged, connected to the piston, the piston is connected to the sealing ring support without any play, and the piston is connected via a threaded connection to the sealing ring support.

2. The piston-cylinder arrangement according to claim 1, wherein the threaded connection is fastened at an outside or an inside of the piston.

3. The piston-cylinder arrangement according to claim 1, wherein a direction of rotation of the threaded connection is adjusted to a direction of rotation of the piston so that the sealing ring support during operation of the piston twists onto it.

4. The piston-cylinder arrangement according to claim 1, wherein a pitch of a thread of the threaded connection is embodied in a self-locking fashion.

5. The piston-cylinder arrangement according to claim 4, wherein the pitch of the thread is embodied flat.

6. The piston-cylinder arrangement according to claim 4, wherein the thread comprises latching hooks.

7. The piston-cylinder arrangement according to claim 1, wherein the sealing ring support is embodied in one piece and is approximately rotationally symmetrical.

8. The piston-cylinder arrangement according to claim 7, wherein the seal is fastened exclusively at the sealing ring support and supported in an arch of the sealing ring support.

9. The piston-cylinder arrangement according to claim 1, wherein the sealing ring support has a U-profile, with a base of the U-profile contacting the piston, while two legs of the U-profile contact the housing, and the seal is supported between the two legs of the U-profile of the sealing ring support.

\* \* \* \* \*